US007211731B2

(12) United States Patent
Nagamine et al.

(10) Patent No.: US 7,211,731 B2
(45) Date of Patent: May 1, 2007

(54) CABLE WITH WATERPROOF PLUG, CONNECTOR CABLE WITH WATERPROOF PLUG, MANUFACTURING METHOD OF CABLE WITH WATERPROOF PLUG, AND CONNECTION STRUCTURE BETWEEN CABLE WITH WATERPROOF PLUG AND TERMINAL

(75) Inventors: Akira Nagamine, Aichi (JP); Takayuki Hori, Aichi (JP); Toshio Kasuga, Chino (JP); Hideo Kon, Chino (JP)

(73) Assignees: J.S.T. Mfg. Co. Ltd., Osaka (JP); Miyasāka Rubber Co., Ltd., Nagano (JP)

(*) Notice: Subject to any disclaimer, the term of this patent is extended or adjusted under 35 U.S.C. 154(b) by 0 days.

(21) Appl. No.: 10/865,505

(22) Filed: Jun. 9, 2004

(65) Prior Publication Data

US 2005/0003709 A1 Jan. 6, 2005

(30) Foreign Application Priority Data

Jun. 10, 2003 (JP) ............................ 2003-165222

(51) Int. Cl.
*H02G 15/02* (2006.01)

(52) U.S. Cl. .................................. 174/74 R; 174/77 R

(58) Field of Classification Search .............. 174/74 R, 174/74 A, 84 R, 84 C, 75 F, 77 R; 439/877, 439/882

See application file for complete search history.

(56) References Cited

U.S. PATENT DOCUMENTS 4,643,506 A * 2/1987 Kobler ....................... 439/271
4,797,116 A * 1/1989 Isohata et al. .............. 439/141
4,828,507 A * 5/1989 Nagase et al. .............. 439/206
4,969,841 A * 11/1990 Sueyoshi et al. ........... 439/595
4,973,266 A * 11/1990 Bullard ....................... 439/589
5,147,222 A * 9/1992 Hotea et al. ................ 439/589

(Continued)

FOREIGN PATENT DOCUMENTS

DE 199 44 427-A 1 3/2001

(Continued)

OTHER PUBLICATIONS

Engineerin Design Guide, (3rd Edition), C & M Corporation (Jan. 1992), pp. 10-14.*

(Continued)

*Primary Examiner*—William H. Mayo, III
(74) *Attorney, Agent, or Firm*—Osha Liang LLP

(57) ABSTRACT

A cable with a waterproof plug includes a cable including a wire and an insulating coating covering the outer circumferential surface of the wire, and a waterproof plug made of an elastic material. The waterproof plug is formed integrally with the cable so as to cover the outer circumferential surface of the insulating coating in an annular region along the length of the cable. The waterproof plug is united to the cable with an adhesive component. By connecting a terminal to the cable at a position nearer to one end of the cable than the portion where the waterproof plug is formed, a connector cable with a waterproof plug is obtained. The cable may be substantially circular in cross section or substantially rectangular in cross section, such as an FFC or FPC.

12 Claims, 9 Drawing Sheets

U.S. PATENT DOCUMENTS

| | | | | | |
|---|---|---|---|---|---|
| 5,351,973 | A | * | 10/1994 | Taniuchi et al. | 277/616 |
| 5,356,312 | A | * | 10/1994 | Abe et al. | 439/587 |
| 5,433,621 | A | * | 7/1995 | Sai | 439/275 |
| 5,498,170 | A | * | 3/1996 | Tanaka | 439/271 |
| 5,519,170 | A | * | 5/1996 | Nabeshima | 174/74 R |
| 5,607,318 | A | * | 3/1997 | Wakata et al. | 439/274 |
| 5,611,706 | A | * | 3/1997 | Makita et al. | 439/275 |
| 5,618,880 | A | * | 4/1997 | Okazaki et al. | 524/731 |
| 5,824,962 | A | * | 10/1998 | Katsuma | 174/135 |
| 5,989,704 | A | * | 11/1999 | Hashimoto et al. | 428/331 |
| 6,059,594 | A | * | 5/2000 | Davis et al. | 439/275 |
| 6,186,829 | B1 | * | 2/2001 | Murakami et al. | 439/587 |
| 6,709,282 | B2 | * | 3/2004 | Sugiyama | 439/275 |
| 6,894,224 | B2 | * | 5/2005 | Kobayashi et al. | 174/74 R |
| 6,953,365 | B2 | * | 10/2005 | Tabata et al. | 439/587 |
| 2002/0031934 | A1 | | 3/2002 | Hara et al. | |
| 2002/0098736 | A1 | | 7/2002 | Hattori et al. | |
| 2003/0027454 | A1 | * | 2/2003 | Sugiyama | 439/588 |
| 2003/0040565 | A1 | * | 2/2003 | Sugiyama et al. | 524/462 |

FOREIGN PATENT DOCUMENTS

| | | | |
|---|---|---|---|
| EP | 0 944 130 | A2 | 9/1999 |
| EP | 1 204 173 | A2 | 5/2002 |
| GB | 2 325 576 | A | 11/1998 |

OTHER PUBLICATIONS

European Search Report issued on corresponding EP Application No. 04291452.3 - 1231; Dated Nov. 13, 2006; 3 pages.

* cited by examiner

FIG. 10

| | | | Insulating Coating of Cable | | | | |
|---|---|---|---|---|---|---|---|
| | | | PE | PVC | PET | PEN | PI |
| Waterproof Plug | Thermosetting Elastomer | Sillicone Rubber (PO) | ○ | ○ | ◎ | ◎ | ◎ |
| | | Sillicone Rubber (AR) | ◎ | ◎ | ◎ | ◎ | ◎ |
| | Thermoplastic Elastomer | Styrene | △ | ◎ | ◎ | ◎ | ◎ |
| | | Polyester | ○ | ◎ | ◎ | ◎ | ◎ |
| | | Polyamide | ◎ | ◎ | ◎ | ◎ | ◎ |
| | | Polyurethane | △ | △ | ◎ | ◎ | ◎ |

CABLE WITH WATERPROOF PLUG, CONNECTOR CABLE WITH WATERPROOF PLUG, MANUFACTURING METHOD OF CABLE WITH WATERPROOF PLUG, AND CONNECTION STRUCTURE BETWEEN CABLE WITH WATERPROOF PLUG AND TERMINAL

BACKGROUND OF THE INVENTION

1. Field of the Invention

The present invention relates to a cable with a waterproof plug, a connector cable with a waterproof plug, a manufacturing method of a cable with a waterproof plug, and a connection structure between a cable with a waterproof plug and a terminal.

2. Description of Related Art

Connectors used in cars, portable devices, etc., are required to be waterproof for preventing water or the like from entering to cause a short circuit.

Cables used for connectors are generally classified into cables substantially circular in cross section and cables substantially rectangular in cross section such as flexible flat cables (FFCs) and flexible printed circuits (FPCs). The former and the latter differ in manner of being attached to connector housings.

In case of cables substantially circular in cross section, in general, a terminal is connected to one end of a cable and the terminal is inserted into a terminal receiving chamber formed in a connector housing. To give waterproofness to such a cable, for example, JP-A-7-245149 discloses a technique in which a waterproof plug is interposed between the cable and a terminal. In this technique, the waterproof plug has a crimp connection portion at its one end and a seal portion at its other end. After the waterproof plug is fitted on one end portion of the cable, one end of the terminal is wound on the outer circumferential surface of the connection portion of the waterproof plug and then the one end of the terminal is crimped. The connection portion of the waterproof plug is thereby also crimped with the one end of the terminal, so that three of the cable, waterproof plug, and terminal are fixed to one another. In this state, the terminal is inserted from its other end into a terminal receiving chamber of a connector housing. The outer circumferential surface of the seal portion of the waterproof plug is brought into close contact with the inner surface of the wall of the terminal receiving chamber so that water or the like can be prevented from entering the terminal receiving chamber.

In the above-described technique, however, the connection portion of the waterproof plug must have a sufficiently large thickness in order not to be broken when being crimped. Further, the seal portion of the waterproof plug has its outer diameter larger than that of the connection portion. In case of a connector provided with cables each having such a waterproof plug, therefore, the cables must be arranged at relatively wide intervals. This makes it difficult to attempt a decrease in size of such a connector.

Further, in the above-described technique, the cable and the waterproof plug are not fixed to each other before being crimped. They are fixed to each other by crimping. Thus, the waterproof plug may shift from its predetermined position when being crimped. This causes a problem of bad positional accuracy of such a waterproof plug.

Furthermore, in the above-described technique, one end of the terminal is made into a form that can be wound on the outer circumferential surface of the waterproof plug. However, if the cable has no need of waterproofness, that is, if no waterproof plug is used, a terminal must be used whose one end is made into another form, for example, that can be wound on the outer circumferential surface of the cable. Thus, terminals having different shapes must be prepared for cases of requiring waterproofness and not requiring waterproofness. This causes a problem of an increase in cost.

On the other hand, in case of cables substantially rectangular in cross section such as FFCs and FPCs, in general, a cable itself is inserted into a connector housing with using no terminal. To give waterproofness to such a connector structure, a technique is known in which a gelatinous sealing agent is interposed between the cable and the inner surface of the connector housing. However, such a gelatinous sealing agent can not be reused after the cable is detached from the connector housing. Thus, a fresh sealing agent must be used every time when the cable is attached to the connector housing. This causes an increase in cost.

SUMMARY OF THE INVENTION

An object of the present invention is to provide a cable with a waterproof plug, a connector cable with a waterproof plug, a manufacturing method of a cable with a waterproof plug, and a connection structure between a cable with a waterproof plug and a terminal, capable of realizing a decrease in size of a connector, improvement of positional accuracy of the waterproof plug, and a decrease in cost.

According to an aspect of the present invention, a cable with a waterproof plug comprises a cable including a wire and an insulating coating covering an outer circumferential surface of the wire; and a waterproof plug made of an elastic material. The waterproof plug is formed integrally with the cable so as to cover an outer circumferential surface of the insulating coating in an annular region along the length of the cable.

According to the invention, the waterproof plug is not fixed to the cable by crimping but formed integrally with the cable. Thus, the thickness of the waterproof plug can be relatively small because the waterproof plug need not be endure such a crimping operation. As a result, when cables each provided with a waterproof plug are arranged to a connector, each interval between neighboring cables can be relatively narrow. Thus, a decrease in size of the connector can be realized.

In addition, because the waterproof plug has been already fixed to the cable before the terminal is connected to the cable, the waterproof plug scarcely shifts from its predetermined position when the terminal is connected to the cable. Thus, the positional accuracy of the waterproof plug is improved.

Further, when the terminal is connected to the cable with the waterproof plug, one end of the terminal need not be wound on the outer circumferential surface of the waterproof plug. This is because the waterproof plug has been already fixed to the cable before the terminal is connected to the cable, and thus the waterproof plug need not be fixed to the cable with the terminal. Therefore, in either of cases of requiring waterproofness and not requiring waterproofness, the same terminal can be used. This can bring about a decrease in cost.

Furthermore, in case of a cable substantially rectangular in cross section such as an FFC or FPC, because the waterproof plug made of an elastic material has been united to the cable without using any gelatinous sealing agent, an increase in cost due to repetitions of the inserting and drawing-out operations of the cable can be suppressed. This is because the waterproof plug made of the elastic material can be reused differently from such a gelatinous sealing agent, which can not be reused after the cable is once detached.

According to another aspect of the present invention, a connector cable with a waterproof plug comprises a cable including a wire and an insulating coating covering an outer circumferential surface of the wire; and a waterproof plug made of an elastic material. The waterproof plug is formed integrally with the cable so as to cover an outer circumferential surface of the insulating coating in an annular region along the length of the cable. The connector cable with the waterproof plug further comprises a terminal connected to the cable at a position nearer to one end of the cable than the portion where the waterproof plug is formed.

According to the invention, a decrease in size of a connector and improvement of positional accuracy of the waterproof plug can be realized for the same reasons as those described above. In addition, because the same terminal can be used in either of cases of requiring waterproofness and not requiring waterproofness, a decrease in cost can be realized.

BRIEF DESCRIPTION OF THE DRAWINGS

Other and further objects, features and advantages of the invention will appear more fully from the following description taken in connection with the accompanying drawings in which:

FIG. 10 is a table showing results of measurement of adhesive forces by various materials between cables and waterproof plugs according to the present invention.

DESCRIPTION OF THE PREFERRED EMBODIMENTS

Hereinafter, preferred embodiments of the present invention will be described.

Figure 1:
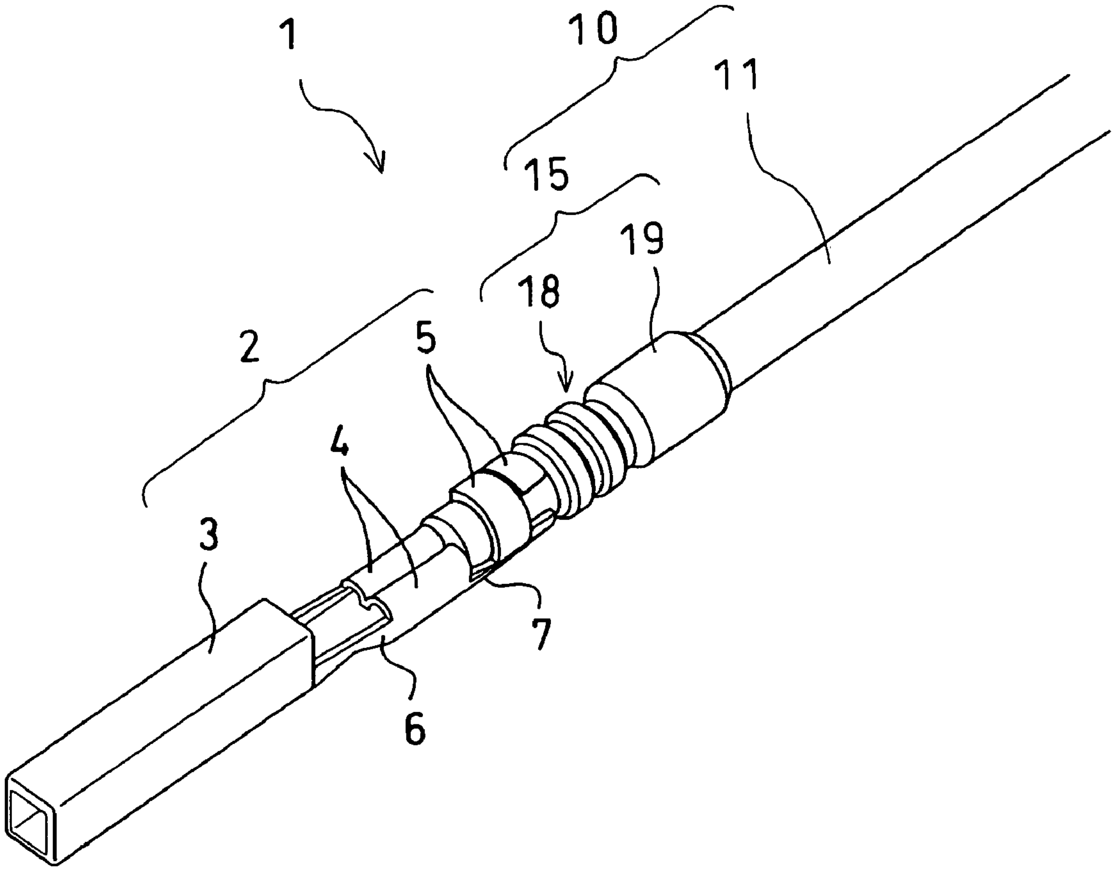
FIG. 1 is a partial perspective view of a connector cable with a waterproof plug according to a first embodiment of the present invention.

First, a connector cable with a waterproof plug according to a first embodiment of the present invention will be described with reference to FIGS. 1, 2A, and 2B, in which the whole of the connector cable and the waterproof plug is denoted by reference numeral 1. As shown in FIG. 1, the connector cable of this embodiment includes a cable 11 and a terminal 2. The cable 11 is provided near its one end with a waterproof plug 15 formed integrally with the cable 11. The whole of the cable 11 and the waterproof plug 15 is denoted by reference numeral 10. The terminal 2 is connected to the one end of the cable 11. More specifically, the terminal 2 is connected to the cable 11 on the front side of the portion where the waterproof plug 15 is formed.

Figure 2A:
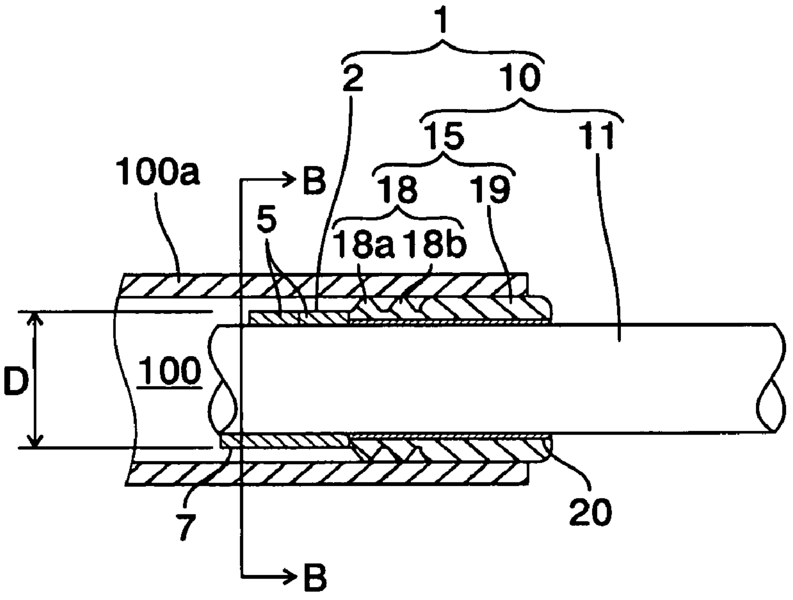
FIG. 2A is a partial vertical sectional view showing a state in which a terminal shown in FIG. 1 has been inserted in a terminal receiving chamber of a connector.
Figure 2B:
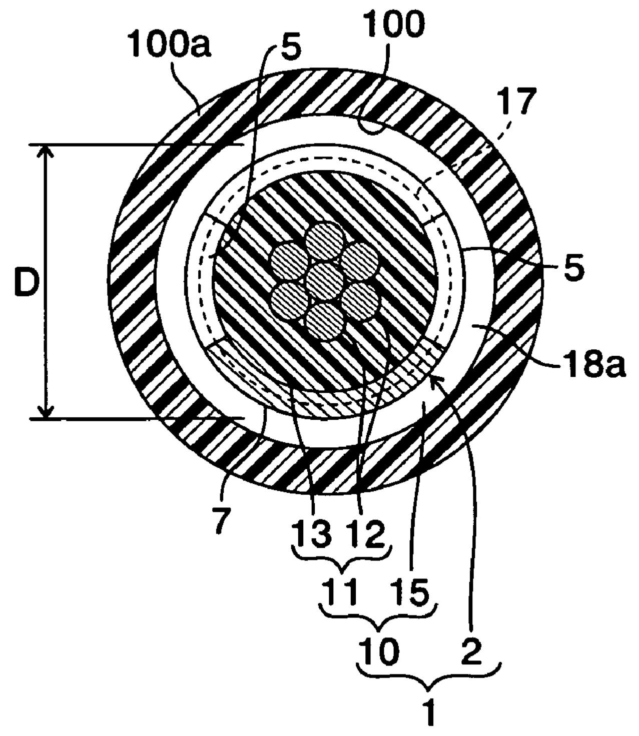
FIG. 2B is a sectional view taken along line B—B in FIG. 2A.

As shown in FIG. 2B, the cable 11 includes therein seven wires 12 and an insulating coating 13 covering the wires 12. The cable 11 is substantially circular in cross section. For example, it has an outer diameter of about 1.6 mm and a length of about 200 mm. The insulating coating 13 has also a function of electrically insulating the wires 12 from one another.

The material of the insulating coating 13 can be adequately selected in accordance with the material of the waterproof plug 15, the adhesive component for bonding the insulating coating 13 and the waterproof plug 15 to each other, etc., as will be described later. In particular, from the viewpoint of the adhesive force to the waterproof plug 15, the main component of the insulating coating 13 is preferably one of a polyethylene (PE) resin, a polyvinyl chloride (PVC) resin, a polyethylene terephthalate (PET) resin, a polyethylene naphthalate (PEN) resin, and a polyimide (PI) resin. Of them, a PET resin, a PEN resin, or a PI resin is more preferable.

As shown in FIG. 1, the waterproof plug 15 is disposed near one end of the cable 11, more specifically, at a position somewhat distant from the one end toward the other end of the cable 11. As shown in FIGS. 2A and 2B, the waterproof plug 15 is cylindrical to cover the insulating coating 13.

As shown in FIG. 2A, an adhesive layer 20 is disposed between the outer circumferential surface of the cable 11 and the inner circumferential surface of the waterproof plug 15, that is, at the interface between the cable 11 and the waterproof plug 15. The waterproof plug 15 and the cable 11 are united with the adhesive component of the adhesive layer 20. The adhesive layer 20 is made of, for example, a silane coupling agent having vinyl groups.

As shown in FIG. 2A, the waterproof plug 15 has an expansion/contraction portion 18 and an annular portion 19 in this order from the one end toward the other end of the cable 11. On the outer circumferential surface of the expansion/contraction portion 18, peaks 18*a* and troughs 18*b* are alternately formed along the length of the cable 11. The annular portion 19 has its outer circumferential surface even in height. The largest outer diameter of the expansion/contraction portion 18, that is, the outer diameter at each peak 18*a*, is the same as the outer diameter of the annular portion 19. The largest outer diameter of the expansion/contraction portion 18 is somewhat larger than the diameter of a terminal receiving chamber 100 formed in a not-shown connector.

When the terminal 2 is being inserted in the terminal receiving chamber 100, each peak 18*a* of the expansion/contraction portion 18 of the waterproof plug 15 is brought into contact with the wall 100*a* of the terminal receiving chamber 100 so that the vicinity of each peak 18*a* is radially pressed and contracted. Attendant upon this deformation of the vicinity of each peak 18*a*, the expansion/contraction portion 18 is expanded as a whole along the length of the cable 11. At this time, the annular portion 19 is also brought into contact with the wall 100*a* and thereby radially pressed and contracted.

As shown in FIGS. 2A and 2B, in a state in which the terminal 2 has been inserted in the terminal receiving chamber 100, the outer circumferential surface of the waterproof plug 15 is in close contact with the inner surface of the wall 100*a* of the terminal receiving chamber 100. Thus, water or the like is prevented from entering the terminal receiving chamber 100.

The waterproof plug 15 is made of an elastic material. In particular, the waterproof plug 15 is preferably made of a thermosetting elastomer or a thermoplastic elastomer. As the thermosetting elastomer, addition reaction type silicone rubber, the setting temperature of which can be relatively easily selected, is preferably used in order that the insulating coating 13 can not be expanded by heat when the waterproof plug 15 is formed with a mold 41 as described later. The main component of the addition reaction type silicone rubber is dimethyl polysiloxane. As the thermoplastic elastomer, one of styrene base, polyester base, polyamide base, and polyurethane base is preferably used from the view point of its adhesive force.

As shown in FIG. 1, the terminal 2 has a rectangular pipe-shaped terminal body 3, an interconnecting portion 6 nearly U-shaped in cross section, extending horizontally from a lower portion of the terminal body 3, a pair of left and right wire crimping portions 4 connected to the terminal body 3 by the interconnecting portion 6, an interconnecting portion 7 extending horizontally from a lower portion of the wire crimping portions 4, and a pair of cable crimping portions 5 connected to the wire crimping portions 4 by the interconnecting portion 7.

Each of the wire crimping portions 4 is curved inward for crimping the wires 12 exposed from the one end of the cable 11. The cable crimping portions 5 are for crimping the insulating coating 13 in the vicinity of the one end of the cable 11. The cable crimping portions 5 are arranged along the length of the terminal 2 to be wound on the outer circumferential surface of the insulating coating 13 counterclockwise and clockwise from the lower portion of the insulating coating 13, respectively. More specifically, as shown in FIGS. 1 and 2A, the cable crimping portions 5 are disposed nearer to the one end of the cable 11 than the waterproof plug 15 to neighbor the waterproof plug 15.

The cable crimping portions 5 provided at one end of the terminal 2 crimp the outer circumference of the cable 11 and thereby the terminal 2 is fixed to the one end portion of the cable 11. That is, the one end portion of the terminal 2 is wound on not the outer circumferential surface of the waterproof plug 15 but the outer circumferential surface of the insulating coating 13 of the cable 11. Thus, in a state in which the terminal 2 has been connected to the one end of the cable 11, as shown in FIGS. 2A and 2B, the largest outer diameter D of the cable crimping portion 5 is equal to the sum of the outer diameter of the cable 11 and the thickness of the cable crimping portion 5.

As described above, in the cable with the waterproof plug of this embodiment, the waterproof plug 15 is not fixed to the cable 11 by crimping but formed integrally with the cable 11. Thus, the thickness of the waterproof plug 15 can be relatively small because the waterproof plug 15 need not be endure such a crimping operation. As a result, when cables 11 each provided with a waterproof plug 15 are arranged to a connector, each interval between neighboring cables 11 can be relatively narrow. Thus, a decrease in size of the connector can be realized.

In addition, because the waterproof plug 15 has been already fixed to the cable 11 before the terminal 2 is connected to the cable 11, the waterproof plug 15 scarcely shifts from its predetermined position when the terminal 2 is connected to the cable 11. Thus, the positional accuracy of the waterproof plug 15 is improved.

Further, when the terminal 2 is connected to the cable 11, one end of the terminal 2 need not be wound on the outer circumferential surface of the waterproof plug 15. This is because the waterproof plug 15 has been already fixed to the cable 11 before the terminal 2 is connected to the cable 11, and thus the waterproof plug 15 need not be fixed to the cable 11 with the terminal 2. Therefore, in either of cases of requiring waterproofness and not requiring waterproofness, the same terminal 2 can be used. This can bring about a decrease in cost.

Furthermore, because the waterproof plug 15 is made of an elastic material, the cable 11 can be smoothly inserted in and drawn out from the terminal receiving chamber 100 of the connector with the waterproof plug 15 being elastically deformed as described above. At this time, because the outer circumferential surface of the waterproof plug 15 is brought into close contact with the inner surface of the wall 100*a* of the terminal receiving chamber 100, the waterproofness can be ensured. Besides, even when the inserting and drawing-out operations are repeated, the waterproofness with the waterproof plug 15 is hard to be deteriorated.

Furthermore, the waterproof plug 15 is united to the cable 11 with the adhesive layer 20 provided at the interface between the cable 11 and the waterproof plug 15. This realizes sure fixture between the waterproof plug 15 and the cable 11.

Next, an example of a manufacturing method of the cable with the waterproof plug of this embodiment will be described with reference to FIGS. 3, 4A, 4B, 5, and 6.

Figure 3:
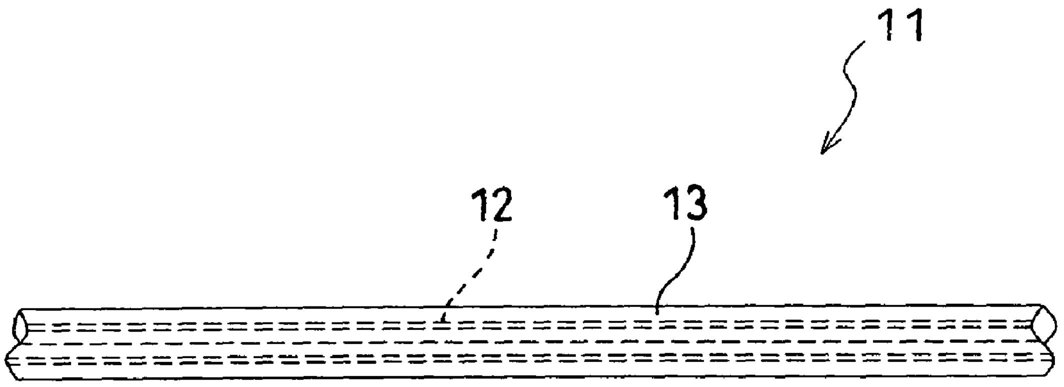
FIG. 3 is a partial plan view of the cable of FIG. 1 on which the waterproof plug has not yet been formed.

First, a cable 11 in which seven wires 12 are covered with an insulating coating 13, though FIG. 3 shows only some of the wires 12, is cut into a predetermined length, for example, about 200 mm. The outer circumferential surface of the insulating coating 13 is then degreased with a degreaser such as isopropyl alcohol.

An adhesive, for example, a silane coupling agent having vinyl groups, is applied with a brush or the like even on the outer circumferential surface of the cable 11 at the portion where a waterproof plug will be formed. The adhesive is then dried to form an adhesive layer 20 as shown in FIG. 2A.

Figure 4A:
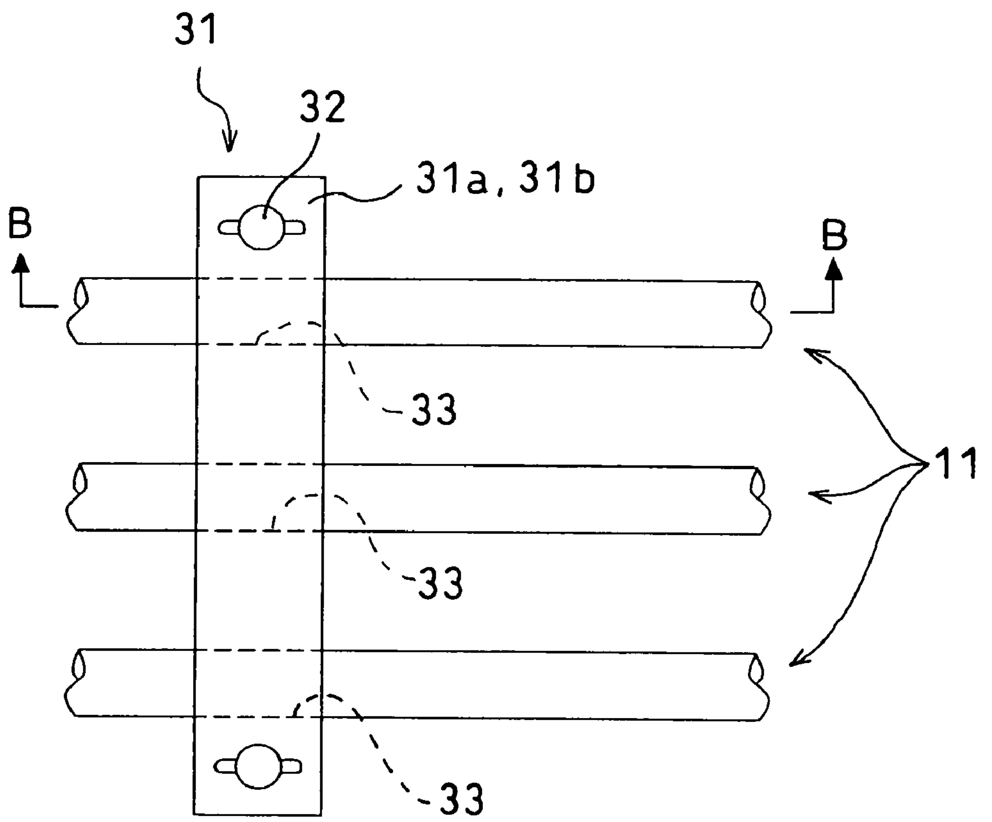
FIG. 4A is a partial plan view showing a state in which three cables of FIG. 3 are being held with a jig.
Figure 4B:
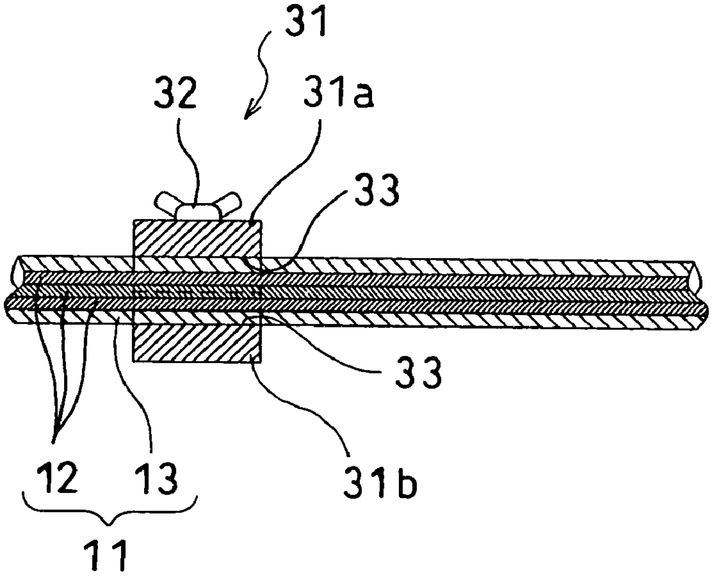
FIG. 4B is a partial sectional view taken along line B—B in FIG. 4A.

Next, as shown in FIGS. 4A and 4B, three such cables 11 are held with a jig 31.

The jig 31 is made up of a pair of upper and lower substantially rectangular parallelepiped slender members 31*a* and 31*b* separable from each other. Through-holes are formed near both ends in the length of each of the slender members 31*a* and 31*b*. A female screw is formed on the inner surface of each through-hole. Three recesses 33 are formed on the face of each of the slender members 31*a* and 31*b* to be opposed to each other. Each recess 33 extends in the width of the slender member 31*a* or 31*b*. The recesses 33 are arranged at regular intervals along the length of the slender member 31*a* or 31*b*. Each recess 33 is semicircular in cross section to form a circle of substantially the same diameter as the outer diameter of each cable 11 in cooperation with the corresponding recess 33 when the slender members 31*a* and 31*b* are united to each other.

To hold the cables 11 with the jig 31, first, the vicinities of one ends of the three cables 11 are put in the respective recesses 33 formed on the lower slender member 31*b*. At this time, each cable 11 is disposed so as to across the slender member 31*b*. Afterward, the upper slender member 31*a* is put on the lower slender member 31*b* to sandwich the cables 11. A wing bolt is then screwed into each through-hole of the slender members 31*a* and 31*b*. The slender members 31*a* and 31*b* are thereby united to each other and the cables 11 are vertically pressed by the slender members 31*a* and 31*b*. As a result, as shown in FIG. 4A, the three cables 11 are held in a state of being arranged parallel to one another at regular intervals.

Figure 5:
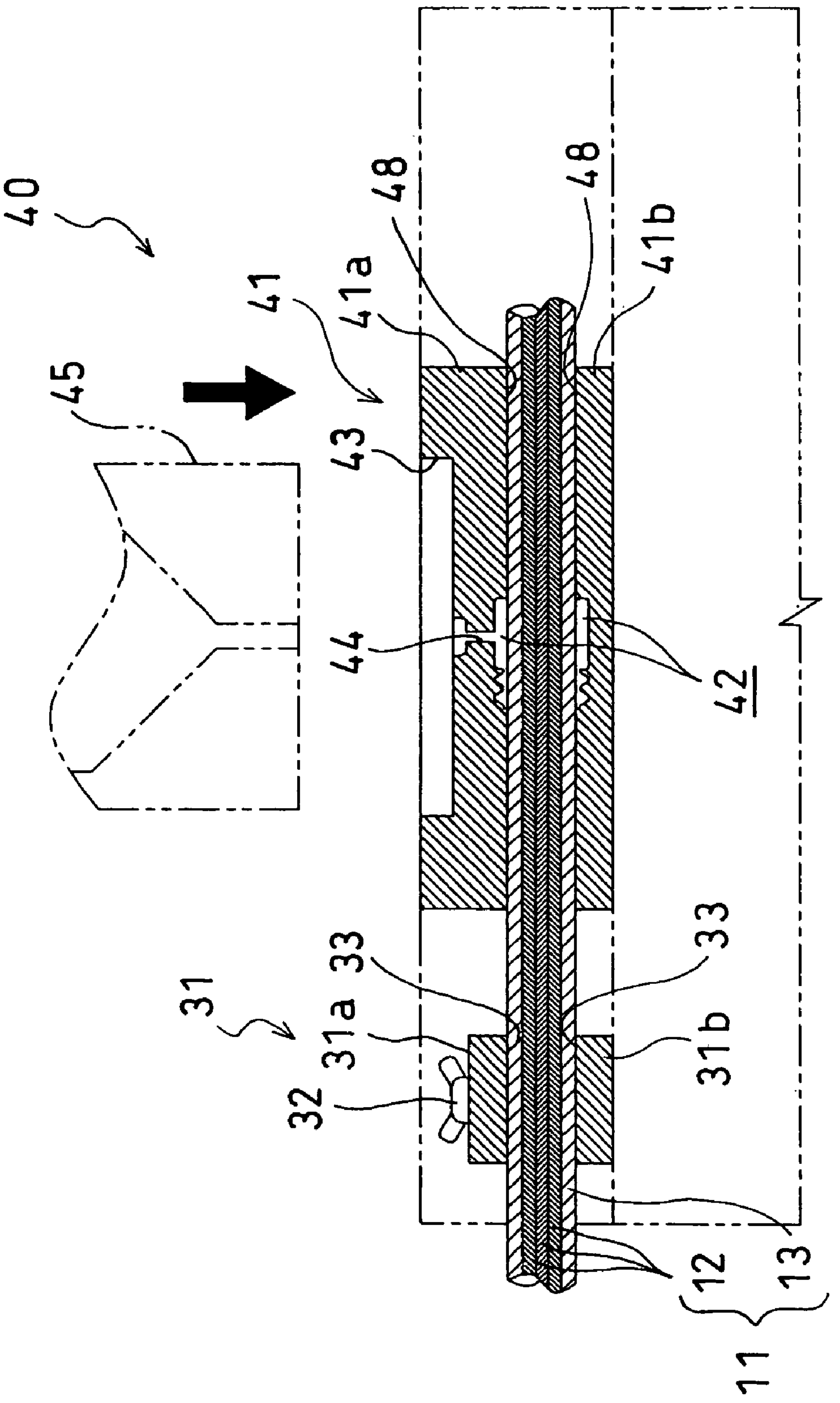
FIG. 5 is a partial sectional view showing a state in which a cable being held with the jig shown in FIGS. 4A and 4B has been set in a mold of an injection molding machine.

Next, as shown in FIG. 5, the cables 11 being held with the jig 31 are set in a mold 41 of an injection molding machine 40.

The mold 41 is made up of a pair of upper and lower parts 41*a* and 41*b* separable from each other. On a face of each of the upper and lower parts 41*a* and 41*b* to be opposed, three cable receiving portions 48 are formed at the same intervals as the intervals between the three cables 11 being held with the jig 31, though FIG. 5 shows only one cable receiving portion 48. Each cable receiving portion 48 is semicircular in cross section to form a circle of substantially the same diameter as the outer diameter of each cable 11 in cooperation with the corresponding cable receiving portion 48 when the upper and lower parts 41*a* and 41*b* are united to each other.

Substantially at the center of the length of each cable receiving portion 48, to form a waterproof plug 15, a cavity 42 having a shape corresponding to the waterproof plug 15 is formed. In other words, the cavity 42 is formed by recessing the wall of the cable receiving portion 48 substantially at the center of the length of the cable receiving portion 48.

In the upper face of the mold 41, a recess 43 is formed that can be fitted on the bottom of a material injection unit 45 of the injection molding machine 40. The recess 43 is connected to the cavity 42 through an interconnecting hole 44. Thus, the material of the waterproof plug 15 can be injected from the material injection unit 45 of the injection molding machine 40 to the cavity 42 through the interconnecting hole 44.

To set the cables 11 in the mold 41 of the injection molding machine 40, first, the three cables 11 are put in the respective cable receiving portions 48 formed in the lower part 41*b* of the mold 41. At this time, the portion of each cable 11 where the adhesive layer 20 as shown in FIG. 2A has been formed is disposed in the corresponding cavity 42. Afterward, the upper part 41*a* of the mold 41 is put on the lower part 41*b* to sandwich the cables 11. Each cable 11 is thereby fixed at a predetermined position.

The material injection unit 45 of the injection molding machine 40 is then moved down so that the bottom of the material injection unit 45 is fitted in the recess 43. Afterward, the material of the waterproof plugs 15 fed in the injection molding machine 40 is injected from material injection unit 45 to each cavity 42 of the mold 41 through the corresponding interconnecting hole 44. The mold 41 in which the material has been injected is then heated to a temperature at which the insulating coating 13 of each cable 11 can not expand, for example, 120 degrees C. or less in case of the insulating coating 13 made of RVC. The material is thereby set. Afterward, the cables 11 are removed from the mold 41 of the injection molding machine 40. In this manner, a cable with a waterproof plug of this embodiment is manufactured as shown in FIG. 6.

Figure 6:
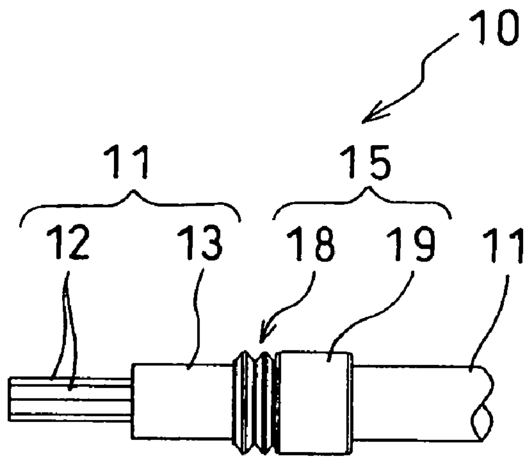
FIG. 6 is a partial side view showing a state in which a waterproof plug has been formed on the cable with the injection molding machine shown in FIG. 5.
Figure 7:
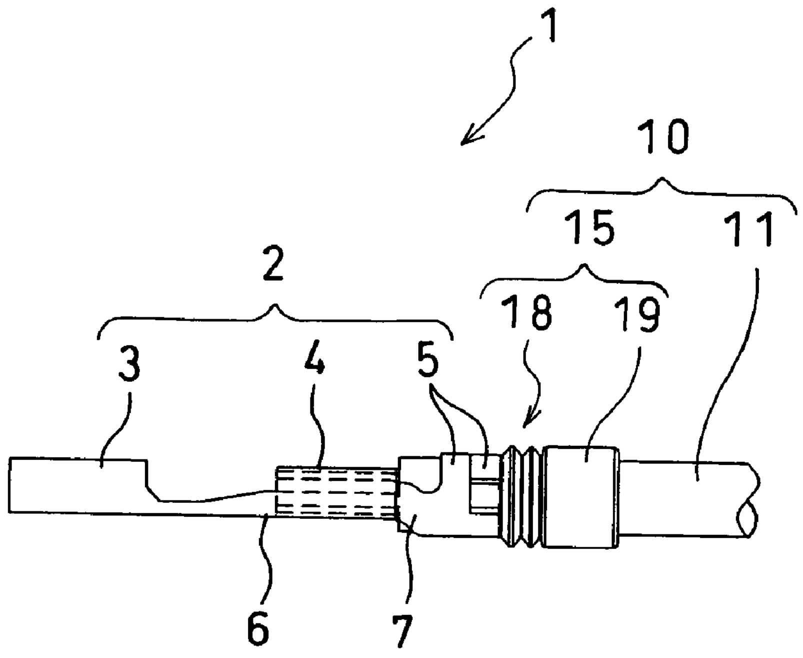
FIG. 7 is a partial side view showing a state in which a terminal has been connected to the cable with the waterproof plug shown in FIG. 6.

Afterward, as shown in FIG. 6, the insulating coating 13 of one end portion of the cable 11 is removed by a predetermined length to expose the wires 12. The exposed wires 12 are crimped with the wire crimping portions 4 of a terminal 2 and the insulating coating 13 near the one end of the cable 11 is crimped with the cable crimping portions 5 of the terminal 2. By thus connecting the terminal 2 to the one end of the cable 11, a connector cable with a waterproof plug of this embodiment is manufactured as shown in FIG. 7.

In the cable with the waterproof plug of the above-described first embodiment, the waterproof plug 15 is fixed to the cable 11 with the adhesive layer 20 provided at the interface between the cable 11 and the waterproof plug 15. However, the present invention is not limited to this structure. For example, a modification is thinkable in which the waterproof plug 15 is fixed to the cable 11 with an adhesive component existing not only the surface of the waterproof plug 15 but also the interior of the waterproof plug 15. An example of a manufacturing method of a cable with a waterproof plug of this case will be described below.

First, the material of the waterproof plug 15 and an adhesive, for example, a silane coupling agent having vinyl groups, are fed in the injection molding machine 40, and they are stirred and mixed. A cable 11 is cut into a predetermined length and the outer circumferential surface of the insulating coating 13 is degreased, like the above-described example.

Afterward, like the above-described example, cables 11 being held with the jig 31 are set in the mold 41 of the injection molding machine 40. The stirred and mixed material is injected from the material injection unit 45 of the injection molding machine 40 into each cavity 42 of the mold 41. The mold 41 in which the material has been injected is then heated to a temperature at which the insulating coating 13 of each cable 11 can not expand. The material is thereby set. Afterward, the cables 11 are removed from the mold 41 of the injection molding machine 40. In this manner, a cable with a waterproof plug is manufactured in which an adhesive component exists substantially even on the surface and in the interior of the waterproof plug 15. Afterward, like the above-described example, the wires 12 are exposed and a terminal 2 is connected to one end of the cable. In this manner, a connector cable with a waterproof plug is manufactured.

In case that an adhesive component exists substantially even on the surface and in the interior of the waterproof plug 15 as described above, the steps of applying an adhesive to the outer circumferential surface of the cable and drying the adhesive can be omitted and thus the manufacturing time can be shortened. More specifically, the step of mixing the material of the waterproof plug 15 and the adhesive with each other can be carried out, for example, while the cables 11 are set in the mold 41.

Figure 8:
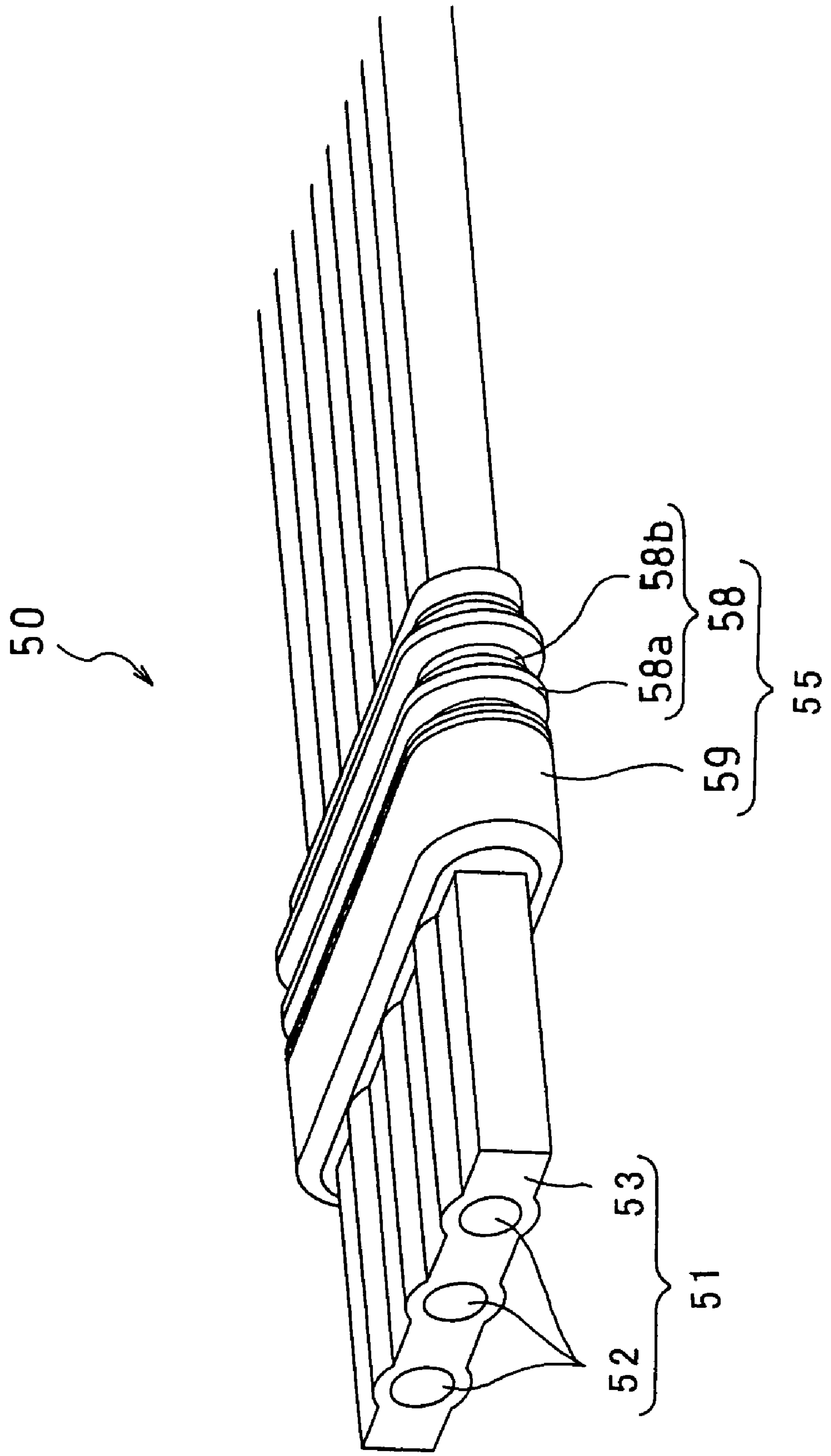
FIG. 8 is a partial perspective view of a cable with a waterproof plug according to a second embodiment of the present invention, in which an FFC is used as the cable.

Next, a cable with a waterproof plug according to a second embodiment of the present invention will be described with reference to FIG. 8. In this embodiment, an FFC 51 substantially rectangular in cross section is used as a cable, and a waterproof plug 55 made of an elastic material is formed near one end of the FFC 51 integrally with the FFC 51. The whole of the FFC 51 and the waterproof plug 55 is denoted by reference numeral 50.

The FFC 51 includes therein three wires 52 and includes an insulating coating 53 covering the wires 52. Each wire 52 is substantially circular in cross section. The wires 52 are arranged substantially at regular intervals.

The waterproof plug 55 is cylindrical to cover the insulating coating 53 of the FFC 51 though the waterproof plug 55 differs in shape from the waterproof plug 15 of the first embodiment because the cables of both embodiments differ in structure. The waterproof plug 55 has an expansion/ contraction portion 58 and an annular portion 59 like the expansion/contraction portion 18 and the annular portion 19 of the first embodiment. More specifically, peaks 58*a* and troughs 58*b* are alternately formed on the outer surface of the expansion/contraction portion 58 along the length of the cable 51. The annular portion 59 has its outer surface even in height. The largest outer diameter of the expansion/contraction portion 58, that is, the outer diameter at each peak 58*a*, is the same as the outer diameter of the annular portion 59.

Figure 9:
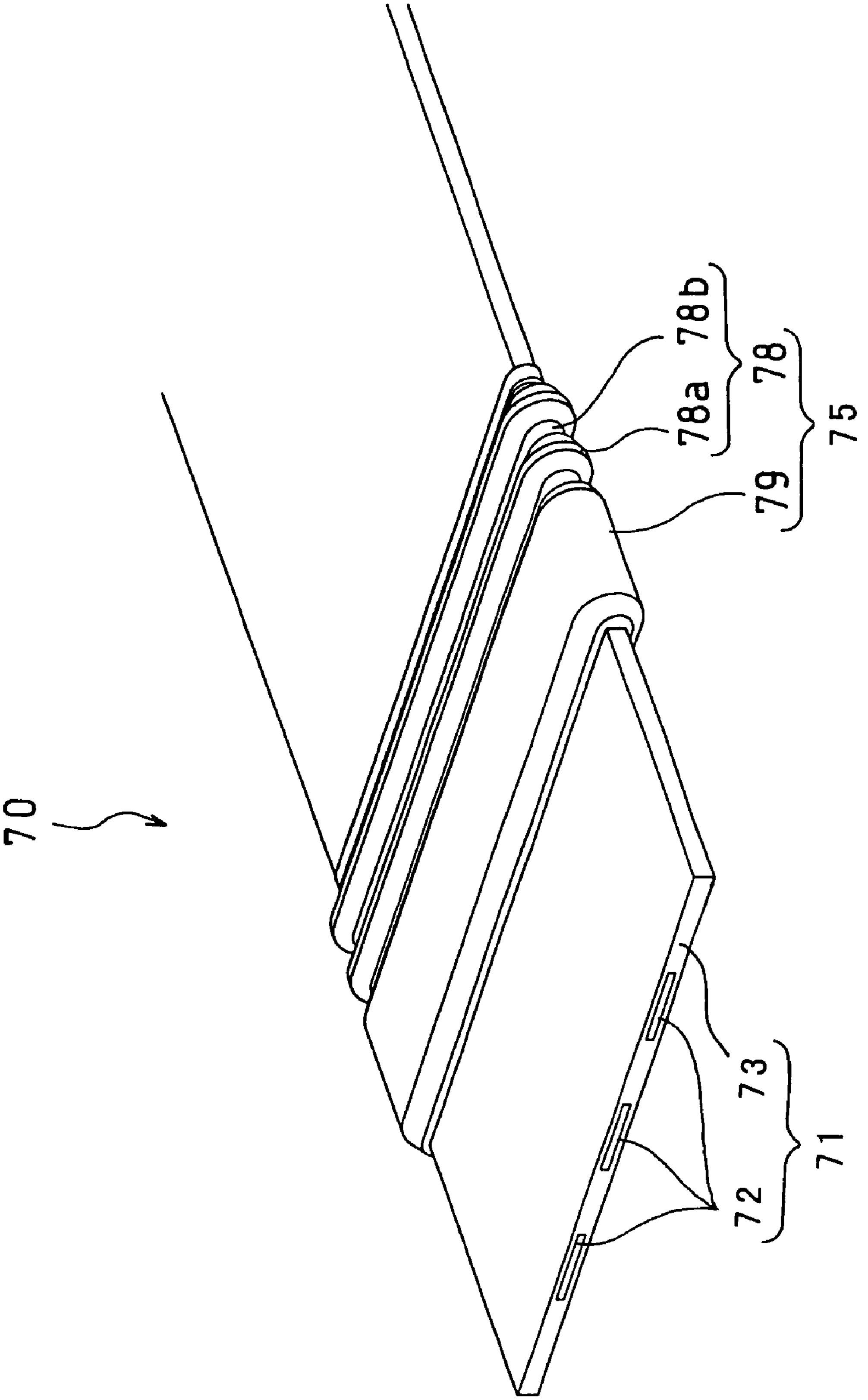
FIG. 9 is a partial perspective view of a cable with a waterproof plug according to a third embodiment of the present invention, in which an FPC is used as the cable.

Next, a cable with a waterproof plug according to a third embodiment of the present invention will be described with reference to FIG. 9. In this embodiment, an FPC 71 substantially rectangular in cross section is used as a cable, and a waterproof plug 75 made of an elastic material is formed integrally with the FPC 71 to cover the outer surface of the FPC 71. The whole of the FPC 51 and the waterproof plug 75 is denoted by reference numeral 70.

The FPC 71 includes therein three wires 72 and includes an insulating coating 73 covering the wires 72. Each wire 72 is laterally oblong, substantially rectangular in cross section. The wires 72 are arranged substantially at regular intervals.

The waterproof plug 75 is cylindrical to cover the insulating coating 73 of the FPC 71, like the waterproof plug 55 of the second embodiment. The waterproof plug 75 has an expansion/contraction portion 78 and an annular portion 79 like the expansion/contraction portion 58 and the annular portion 59 of the second embodiment. More specifically, peaks 78*a* and troughs 78*b* are alternately formed on the outer surface of the expansion/contraction portion 78 along the length of the cable 71. The annular portion 79 has its outer surface even in height. The largest outer diameter of the expansion/contraction portion 78, that is, the outer diameter at each peak 78*a*, is the same as the outer diameter of the annular portion 79.

In the second or third embodiment, a not-shown adhesive layer like the adhesive layer 20 of the first embodiment is formed at the interface between the cable 51 or 71 and the waterproof plug 55 or 75. The waterproof plug 55 or 75 is united to the cable 51 or 71 with the adhesive component of the adhesive layer.

As for a manufacturing method of the cable with the waterproof plug of the second or third embodiment, if the shapes of each recess 33 of the jig 31, each cavity 42 of the mold 41, and so on, are changed so as to correspond to the shape of the cable 51 or 71, the same manufacturing method as that in the above-described first embodiment can be adopted.

In case of the cable 51 or 71 substantially rectangular in cross section as in the above-described second or third embodiment, because the waterproof plug 55 or 75 made of an elastic material has been united to the cable 51 or 71 without using any gelatinous sealing agent, an increase in cost due to repetitions of the inserting and drawing-out operations of the cable can be suppressed. This is because the waterproof plug 55 or 75 made of the elastic material can be reused differently from such a gelatinous sealing agent, which can not be reused after the cable is once detached.

Next, specific examples of the present invention will be described.

EXAMPLE 1

A cable having a diameter of 1.6 mm phi and including an insulating coating made of a PVC resin was cut into a length of about 200 mm. The outer circumferential surface of the insulating coating was degreased with isopropyl alcohol. Afterward, an adhesive, DY39-067 manufactured by Dow Corning Toray Silicone Co., Ltd., was applied with a brush on the outer circumferential surface of the insulating coating and then dried in the air for 30 minutes. Such cables on each of which an adhesive layer had been thus formed were held with a jig 31 and set in a mold 41. Using an injection molding machine, VS-15-7-L manufactured by Sanjo Seiki Co., Ltd., addition reaction type silicone rubber of a thermosetting elastomer, DY-35-405A/H manufactured by Dow Corning Toray Silicone Co., Ltd., as the material of waterproof plugs, was injected at a pressure into the mold 41. The injection pressure was $1.02\times10^{-5}$ Pa; the molding temperature was 115 degrees C.; the molding time (crosslinking time) was two minutes; and the injection speed was 10%. The term “injection speed of 10%” means 10% of the set value of the injection molding machine.

After the material thus injected was set in the mold 41, the cables were removed from the mold 41. As a result, each cable was provided with a waterproof plug formed integrally with the cable. A cable with a waterproof plug according to the first embodiment of the present invention could be manufactured thus.

EXAMPLE 2

In place of the cable of Example 1, a heat-resisting FFC including an insulating coating made of a PE resin was used. The outer circumferential surface of the insulating coating was degreased with isopropyl alcohol, like Example 1. Afterward, another adhesive than that of Example 1, G-790 manufactured by Wacker Asahikasei Silicone Co., Ltd., was applied with a brush on the outer circumferential surface of the insulating coating and then dried in the air for 30 minutes. Such FFCs on each of which an adhesive layer had been thus formed were held with a jig and set in a mold. Using the same injection molding machine as that of Example 1, that is, VS-15-7-L manufactured by Sanjo Seiki Co., Ltd., the same material as that of Example 1 was injected at a pressure into the mold. The injection pressure, the molding temperature, the molding time, and the injection speed were the same as those of Example 1.

After the material thus injected was set in the mold, the FFCs were removed from the mold. As a result, each FFC was provided with a waterproof plug formed integrally with the FFC. A cable with a waterproof plug according to the second embodiment of the present invention could be manufactured thus.

EXAMPLE 3

Using the same cable as that of Example 1, the outer circumferential surface of the insulating coating was degreased with isopropyl alcohol, like Examples 1 and 2. Afterward, another adhesive than those of Examples 1 and 2, Chemlock 481 manufactured by Lord Chemical Products, was applied with a brush on the outer circumferential surface of the insulating coating and then dried with a batch drier at 80 degrees C. for 20 minutes. Such cables on each of which an adhesive layer had been thus formed were held with a jig 31 and set in a mold 41. Using another injection molding machine than that of Examples 1 and 2, VSS-30-35-L manufactured by Sanjo Seiki Co., Ltd., a styrene-base thermoplastic elastomer, SEPTON CJ001 manufactured by Kuraray Co., Ltd., different from that of Examples 1 and 2, was injected at a pressure into the mold 41. The injected material temperature was 240 degrees C.; the injection time was 0.5 seconds; the mold cooling time was 25 seconds; and the mold temperature was 85 degrees C.

After the material thus injected was set in the mold 41, the cables were removed from the mold 41. As a result, each cable was provided with a waterproof plug formed integrally with the cable. A cable with a waterproof plug according to the first embodiment of the present invention could be manufactured thus.

Next, the adhesive force between the cable and the waterproof plug will be described.

FIG. 10 shows results of evaluation-of adhesive force with "triangle", "circle", and "double circle" when the material of the insulating coating 13, 53, or 73 of the cable 11, 51, or 71 and the material of the waterproof plug 15, 55, or 75 are varied. In FIG. 10, "triangle" represents a state in which the waterproof plug is bonded to the cable and can bring about waterproofness, "circle" represents a state in which the adhesive force is stronger than the state "triangle", and "double circle" represents a state in which the adhesive force is stronger than the state "circle".

As the material of the insulating coating 13, 53, or 73 used were a PE resin, a PVC resin, a PET resin, a PEN resin, and a PI resin. As the material of the waterproof plug 15, 55, or 75 used were setting type silicone rubber and addition reaction type silicone rubber as thermosetting elastomers, and styrene-base, polyester-base, polyamide-base, and polyurethane-base thermoplastic elastomers. Adhesives were adequately selected in accordance with the materials of the insulating coating and the waterproof plug.

From FIG. 10, it is understood that the waterproof plug can be formed integrally with the cable and good adhesive forces can be obtained in any combination of the above materials. Thus, a cable with a waterproof plug of the present invention can be manufactured in any combination of the above materials.

Particularly in case that the material of the insulating coating is the PET resin, the PEN resin, or the PI resin, very good adhesive forces could be obtained even when any of the above six kinds of materials was selected for the waterproof plug. On the other hand, in case that the material of the insulating coating is the PE resin, although the styrene-base and polyurethane-base thermoplastic elastomers as the material of the waterproof plug resulted in adhesive forces of "triangle", the other materials brought about good adhesive forces. Further, in case that the material of the insulating coating is the PVC resin, although the polyurethane-base thermoplastic elastomer as the material of the waterproof plug resulted in an adhesive force of "triangle", the other materials brought about good adhesive forces. In case that the material of the waterproof plug was the addition reaction type silicone rubber, any of the above five kinds of materials for the insulating coating brought about very good adhesive forces.

In general, a PE resin or a PVC resin is used as the material of the insulating coating. In such a case, it was found that a good adhesive force was obtained by using addition reaction type silicone rubber as the material of the waterproof plug and using a vinyl-base compound, for example, a silane coupling agent having vinyl groups, as the adhesive.

The same results as described above were obtained in any of the cases of applying the adhesive onto the outer circumferential surface of the insulating coating and mixing the adhesive in the material of the waterproof plug.

The waterproof plug suffices if it is made of an elastic material. The material of the waterproof plug is not limited to a thermosetting or thermoplastic elastomer. The material of the insulating coating is also not limited to the above-described materials, and various other materials can be used.

The adhesive is not limited to a vinyl-base compound such as a silane coupling agent having vinyl groups. Various adhesives can be used in accordance with the materials of the waterproof plug and the insulating coating of the cable. Further, the waterproof plug may not be united to the cable with an adhesive component. The waterproof plug may be united to the cable with a medium other than an adhesive component or without such a medium.

The cable may not be substantially circular or rectangular in cross section as in the above-described embodiments. Cables having various shapes can be used.

In the first embodiment, the terminal 2 has the cable crimping portion 5 and the cable crimping portion 5 crimps the insulating coating 14 of the cable 11 to fix the terminal 2 to the cable 11. However, the present invention is not limited to this. That is, a terminal 2 may be fixed to a cable 11 with a structure other than such a crimping structure.

As for the manufacturing method, such a jig 31 as described above may not be used. Further, three cables in a lump may not be set in the mold. Only one cable may be set in each mold. Otherwise, two cables or four or more cables in a lump may be set in a mold.

The forming method of the waterproof plug is not limited to injection molding as described above. Compression molding, transfer molding, or calendering can be used.

While this invention has been described in conjunction with the specific embodiments outlined above, it is evident that many alternatives, modifications and variations will be apparent to those skilled in the-art. Accordingly, the preferred embodiments of the invention as set forth above are intended to be illustrative, not limiting. Various changes may be made without departing from the spirit and scope of the invention as defined in the following claims.

What is claimed is:

1. A cable with a waterproof plug, comprising:

a cable including a wire and an insulating coating covering an outer circumferential surface of the wire, wherein the insulating coating of the cable has the same outer circumferential shape and the same outer circumferential size in any cross section perpendicular to the cables length direction; and a waterproof plug made of an elastic material, the waterproof plug being formed sealingly secured around the insulating coating of the cable so as to cover an outer circumferential surface of the insulating coating in an annular region that extends along a length of the cable from a position distant from one end of the insulating coating of the cable in a direction away from the one end.

2. The cable with the waterproof plug according to claim 1, wherein the waterproof plug is made of one of a thermosetting elastomer and a thermoplastic elastomer.

3. The cable with the waterproof plug according to claim 2, wherein a main component of the thermosetting elastomer is dimethyl polysiloxane, and a main component of the thermoplastic elastomer is one of styrene, polyester, polyamide, and polyurethane.

4. The cable with the waterproof plug according to claim 1, wherein the waterproof plug is made of addition reaction type silicone rubber.

5. The cable with the waterproof plug according to claim 1, wherein a main component of the insulating coating is one of a polyethylene resin, a polyvinyl chloride resin, a polyethylene terephthalate resin, a polyethylene naphthalate resin, and a polyimide resin.

6. The cable with the waterproof plug according to claim 1, wherein a main component of the insulating coating is one of a polyethylene terephthalate resin, a polyethylene naphthalate resin, and a polyimide resin.

7. The cable with the waterproof plug according to claim 1, wherein the waterproof plug is united to the cable with an adhesive component.

8. The cable with the waterproof plug according to claim 7, wherein the adhesive component exists only at an interface between the cable and the waterproof plug.

9. The cable with the waterproof plug according to claim 7, wherein the adhesive component exists substantially even on a surface of the waterproof plug and within the waterproof plug.

10. The cable with the waterproof plug according to claim 7, wherein a main component of the insulating coating is one of a polyethylene resin and a polyvinyl chloride resin, the waterproof plug is made of addition reaction type silicone rubber, and the adhesive component is a vinyl-base compound.

11. The cable with the waterproof plug according to claim 1, wherein the cable is substantially circular in cross section.

12. The cable with the waterproof plug according to claim 1, wherein the cable is substantially rectangular in cross section.

* * * * *